United States Patent
Trainin et al.

(10) Patent No.: US 8,619,650 B2
(45) Date of Patent: Dec. 31, 2013

(54) METHOD, APPARATUS AND SYSTEM FOR SCHEDULING IN A WIRELESS COMMUNICATION NETWORK

(75) Inventors: Solomon B. Trainin, Haifa (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 13/004,389

(22) Filed: Jan. 11, 2011

(65) Prior Publication Data

US 2012/0177013 A1 Jul. 12, 2012

(51) Int. Cl.
*H04B 7/00* (2006.01)
*H04B 7/212* (2006.01)
*H04W 36/00* (2009.01)

(52) U.S. Cl.
USPC ........ 370/310.2; 370/312; 370/319; 370/320; 370/321; 370/328; 370/335; 370/336; 370/337; 370/338; 455/436; 455/437; 455/438; 455/439; 455/440; 455/441; 455/442; 455/443; 455/444

(58) Field of Classification Search
USPC .................. 370/310.2, 312, 319–321, 328, 370/335–338, 395.4; 455/436–444
See application file for complete search history.

(56) References Cited

U.S. PATENT DOCUMENTS

| 7,477,616 | B2* | 1/2009 | Wang et al. ................... 370/311 |
| 2002/0136230 | A1* | 9/2002 | Dell et al. ..................... 370/416 |
| 2004/0131019 | A1 | 7/2004 | Kandala |
| 2006/0171362 | A1 | 8/2006 | Garg et al. |
| 2007/0161364 | A1* | 7/2007 | Surineni et al. ............ 455/343.4 |
| 2007/0297351 | A1 | 12/2007 | Trainin |
| 2008/0151835 | A1* | 6/2008 | Kneckt et al. ................. 370/331 |
| 2008/0181129 | A1* | 7/2008 | Beyers et al. ................. 370/253 |
| 2009/0233545 | A1* | 9/2009 | Sutskover et al. .............. 455/25 |
| 2009/0252135 | A1* | 10/2009 | Benveniste ................... 370/338 |
| 2010/0054213 | A1* | 3/2010 | Trainin ......................... 370/336 |
| 2010/0316032 | A1* | 12/2010 | Chu et al. ..................... 370/338 |
| 2012/0177013 | A1* | 7/2012 | Trainin et al. ................ 370/336 |

FOREIGN PATENT DOCUMENTS

| JP | 5-328430 | 12/1993 |
| JP | 11-74829 | 3/1999 |
| JP | 2008-131404 | 6/2008 |

OTHER PUBLICATIONS

IEEE Standard for Information Technology—Telecommunications and Information exchange between systems—Local and metropolitan area networks—Specific requirements; Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension; IEEE Std 802.15.3c™-2009 (Amendment to IEEE Std 802.15.3c™-2003).
Standard ECMA-387, 2nd Edition; Dec. 2010; High Rate 60 GHz PHY, MAC and PALs.
Wireless Gigabit Alliance WiGig MAC and PHY specification Version1.0; Apr. 2010.
WirelessHD Specification Version 1.1 Overview; May 2010.

(Continued)

*Primary Examiner* — Benjamin H Elliott, IV
(74) *Attorney, Agent, or Firm* — Shichrur & Co.

(57) ABSTRACT

Devices, systems and methods to schedule a service period at a wireless network. A wireless network controller of the wireless network may set a start time of a service period. The start time is no less than a predefined time after transmitting by the wireless network controller an information element containing the service period scheduling information.

22 Claims, 3 Drawing Sheets

(56) References Cited

OTHER PUBLICATIONS

International Search Report and Written Opinion for PCT Patent Application No. PCT/US2011/066335, Mailed on Jul. 30, 2012, 10 pages.
Office Action for Japanese Patent Application 2012-001275, mailed on Aug. 27, 2013, 4 pages (2 pages of English translation).
Chao-Chun Wang, New MAC Features for TGad, IEEE802.11-10/0441r3, IEEE mentor, May 16, 2010, 23 pages.
Carlos Cordeiro, D0.1 comment resolution part 2, IEEE 802.11-10/978r1, IEEE mentor, Aug. 12, 2010, 17 pages.
Peter Ecclesine, Regulatory Class Coverage, IEEE 802.11-07/0754r0, IEEE mentor, May 13, 2007, 4 pages.
Carlos Cordeiro, PHY/MAC Complete Proposal to TGad, IEEE802.11-10/0432r2, IEEE mentor, May 18, 2010, 21 pages.

* cited by examiner

METHOD, APPARATUS AND SYSTEM FOR SCHEDULING IN A WIRELESS COMMUNICATION NETWORK

BACKGROUND OF THE INVENTION

A personal wireless area network (WPAN) is a network used for communication among computing devices (for example, personal devices such as telephones and personal digital assistants) close to one person. The reach of a WPAN may be a few meters. WPANs may be used for interpersonal communication among personal devices themselves, or for connecting via an uplink to a higher level network, for example the Internet.

The millimeter-wave WPAN and/or mmWave network may allow very high data rates (e.g., over 2 Gigabit per second (Gbps)) applications such as high speed Internet access, streaming content download (e.g., video on demand, high-definition television (HDTV), home theater, etc.), real time streaming and wireless data bus for cable replacement, wireless display, sink and go or the like.

Some mmWave WPAN may include a personal basic service set (PBSS). The PBSS may include a plurality of stations (STA). The STAs may be multi-band capable STAs and/or 60 GHz STAs. The mmWave WPAN may also allow one of the STAs to operate as a PBSS control point (PCP). The PBSS enables the devices to work directly each other via a direct link between two stations. The PCP is capable to assign and to schedule a service period (SP) for the directly communicating station.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
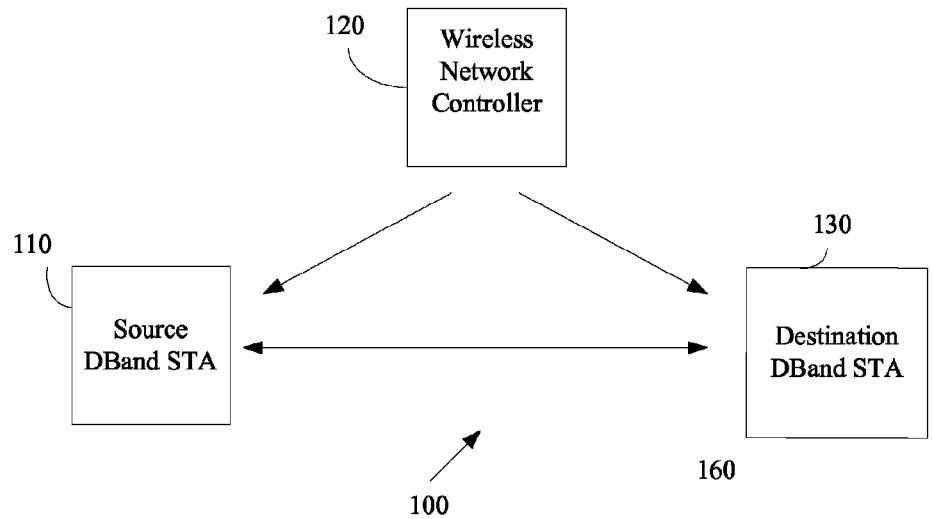
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term PBSS control point (PCP) as used herein, is defined as a station (STA) that operates as a control point of the mmWave network.

The term an access point (AP) as used herein, is defined as any entity that has station (STA) functionality and provides access to the distribution services, via the wireless medium (WM) for associated STAs.

The term wireless network controller as used herein, is defined as a station that operates as PCP and/or as AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as stations (STAs). The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

Embodiments of the invention may provide devices, systems and methods to schedule a service period in mmWave network. For example, a PCP of the mmWave network is able to set a start time of a service period wherein the start time is, or starts, no less than a predefined time after transmitting the PCP an information element containing the service period scheduling information, although the scope of the present invention is not limited to these examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, WPANs, and the like.

Types of WPAN stations intended to be within the scope of the present invention include, although are not limited to, stations capable of operating as a multi-band stations, stations capable of operating as a PCP, stations capable of operating as AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: *Wireless LAN Medium Access Control (MAC) and Physical Layer (PHY) Specifications*) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 is a schematic illustration of a wireless communication network 100 according to exemplary embodiments of the present invention. For example, wireless communication network 100 may operate according to the standard developed by the IEEE 802 802.11 Task Group ad (TGad) and/or according to WGA specification and/or according to IEEE 802.15.3c standard and/or according to WirelessHD™ specification and/or ECMA-387 standard or the like.

Although the scope of the present invention is not so limited, wireless communication network 100 may include a station 110, a wireless network controller 120 and a station 130. According to this example embodiments station 110 may be capable of operating as a source DBand station and station 130 be capable of operating as a destination DBand station, although the scope of the present invention is not limited in this respect. Other or different numbers of radios may be included.

In operation, wireless network controller 120 may be a PCP and/or AP, if desired. Wireless network controller 120 may schedule a service period (SP) for source DBand station 110 and destination DBand station 130. For example a scheduled SP may be a pseudo-static SP and non-pseudo static SP, if desired. Pseudo-static SPs may be the SPs whose position and duration repeats many (unlimited) times without changes and with no intervention of the stations, although the scope of the present invention is not limited in this respect.

According to this exemplary embodiment, when scheduling a non-pseudo static SP or changing the start time of an existing pseudo-static SP which has a non-PCP/non-AP STA as a source DBand STA (e.g., STA 110) or as a destination DBand STA (e.g., STA 130) 130 of the SP wireless network controller 120 may set the start time of the SP to be or to start no less than a predetermined time after a last schedule information element containing this SP is transmitted by wireless network controller 120, for example PCP or AP, although the scope of the present invention is not limited in this respect.

Figure 2:
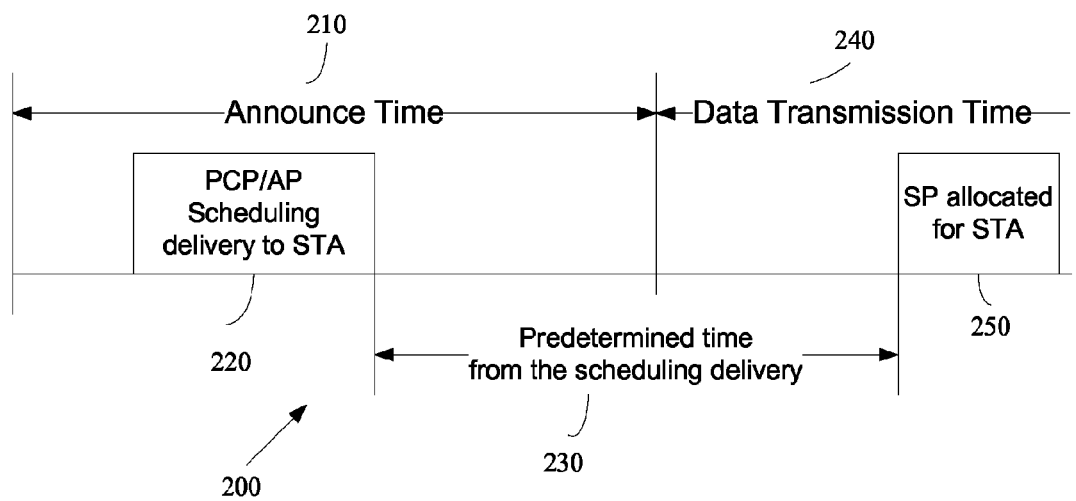
FIG. 2 is a schematic illustration of a time line according to exemplary embodiment of the invention.

FIG. 2 is a schematic illustration of a time line according to an exemplary embodiment of the invention. The time line 200 may include an announce time 210 and a data transmission time 240. According to this example embodiment at announce time 210 wireless network controller 120, for example PCP/AP, may schedule a delivery of data 220 to one of the stations 110 and 120. A predetermined time 230 from scheduling of the delivery 220 to the start time of an SP allocated to the station 250 may be set.

For example, the predetermined time 230 may be defined as a minimum allocation delivery time and may be set to 300 μsec, if desired. Other time periods may be used. Source DB and STA 110 and/or destination DB and STA 130 may use the minimum allocation delivery time for parsing an information element, if desired.

Parsing of the information element is time sensitive, so the predictable position of the element in a transmitted frame is highly desirable. According to one exemplary embodiment of the invention, the information element may be placed as the first information element of the frame for example, an announce frame as is shown with table 1 below.

TABLE 1

Announce frame

| Order | Information |
|---|---|
| 1 | Category = DBand |
| 2 | Action |
| 3 | Timestamp |
| 4 | Beacon Interval |
| 5 | Service Set Identifier (SSID) (optional) |
| 6 | Extended Schedule element (optional) |
| Last - 1 | Several information elements can appear in this frame. These information elements follow all other information elements that are not vendor-specific information elements and precede all other information elements that are vendor-specific information elements. |
| Last | Vendor Specific (optional) |

According to this example the Category field is may be set the category for DBand. The Action field may be set to the value corresponding to Announce. The Extended Schedule element may provide information for each allocation of time. For example, for each allocation the extended schedule element may provide beam forming control, identification (ID) of source and destination stations, number of blocks, a start time, etc. Any number of information elements may be included within the Announce frame, although the scope of the present invention is not limited in this respect.

Figure 3:
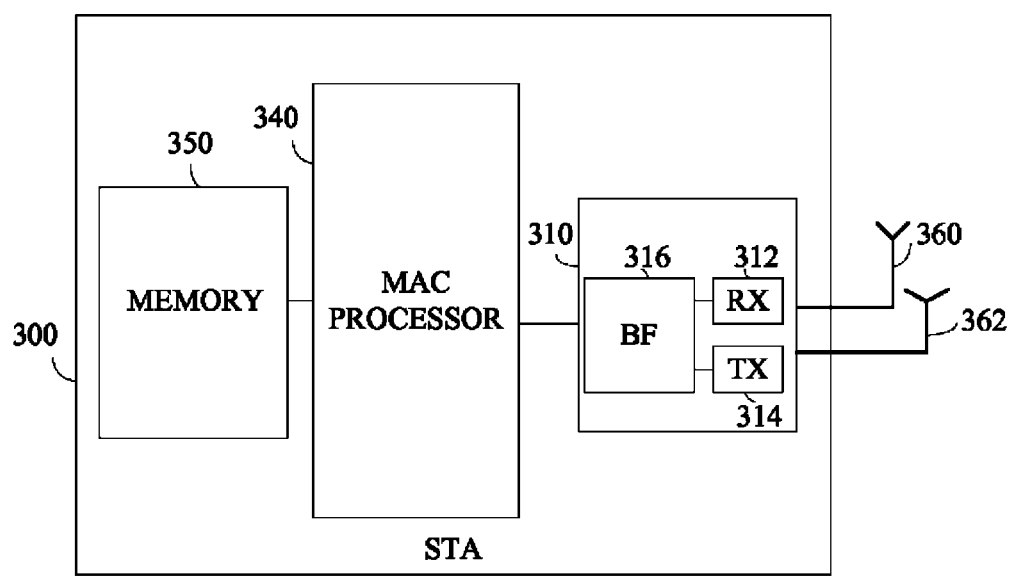
FIG. 3 is a schematic illustration of a station of a wireless communication network according to exemplary embodiments of the present invention.

Turning first to FIG. 3 a schematic illustration of a station (STA) of a wireless communication network according to exemplary embodiments of the present invention is shown. According to embodiments of the present invention a station 300 may be a wireless communication device that is capable of operating, for example, as: an access point, a piconet controller (PNC), a station, a multiband station, a DBand station, an initiator, a responder or the like.

According to some exemplary embodiments of the invention station 300 may include for example, a radio 110. Radio 110 may be operably coupled to two or more antennas. For example radio 110 may be operably coupled to antennas 360 and 362. Radio 110 may include at least, a receiver (RX) 312, a transmitter (TX) 314 and a beamforming (BF) controller 316, although the scope of the present invention is not limited in this respect.

Furthermore, according to some embodiments of the invention, radio 310 may operate on the DBand for example, 60 GHz frequency band. Station 300 may further include a MAC processor 340 and a memory 350. MAC processor 340 may operate a MAC protocol according to IEEE 802.11TAGad and/or IEEE 802.15.3c and or WirelessHD™ and/or ECMA-387 and/or ISO/IEC 13156:2009 and/or Bluetooth™ and/or WGA specification, if desired.

Memory 350 may include one or more of volatile memory, non-volatile memory, removable or non-removable memory, erasable or non-erasable memory, writeable or re-writeable memory, and the like. For example, memory 350 may include one or more random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like.

In some exemplary embodiments, antennas 360 and 362 may include, for example, phase array antennas, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data, although the scope of the present invention is not limited to these examples.

In some exemplary embodiments of the invention, BF controller 316 may include a multiple-input-multiple-output (MIMO) controller and/or a beamformer processor, if desired.

According to embodiment of the invention station 300 may operate as a wireless network controller to schedule or set a service period (SP) in the wireless network (e.g., PBSS 100). MAC processor 340 may schedule or set a start time of the SP the PBSS 100. For example, the start time may be or may start no less than a predefined time after transmitting an information element containing or being the service period scheduling information. MAC processor 340 may be able to change the start time of an existing pseudo-static SP which has a non PCP station as a source DBand station (e.g., source DBand STA 110) and\or a destination DBand station the SP (e.g., destination DBand STA 130), if desired.

According to one exemplary embodiment of the invention, transmitter 312 may be operably coupled to an antenna array for example, antennas 360, 362 which is able to transmit a non-pseudo static service period scheduling information.

Figure 4:
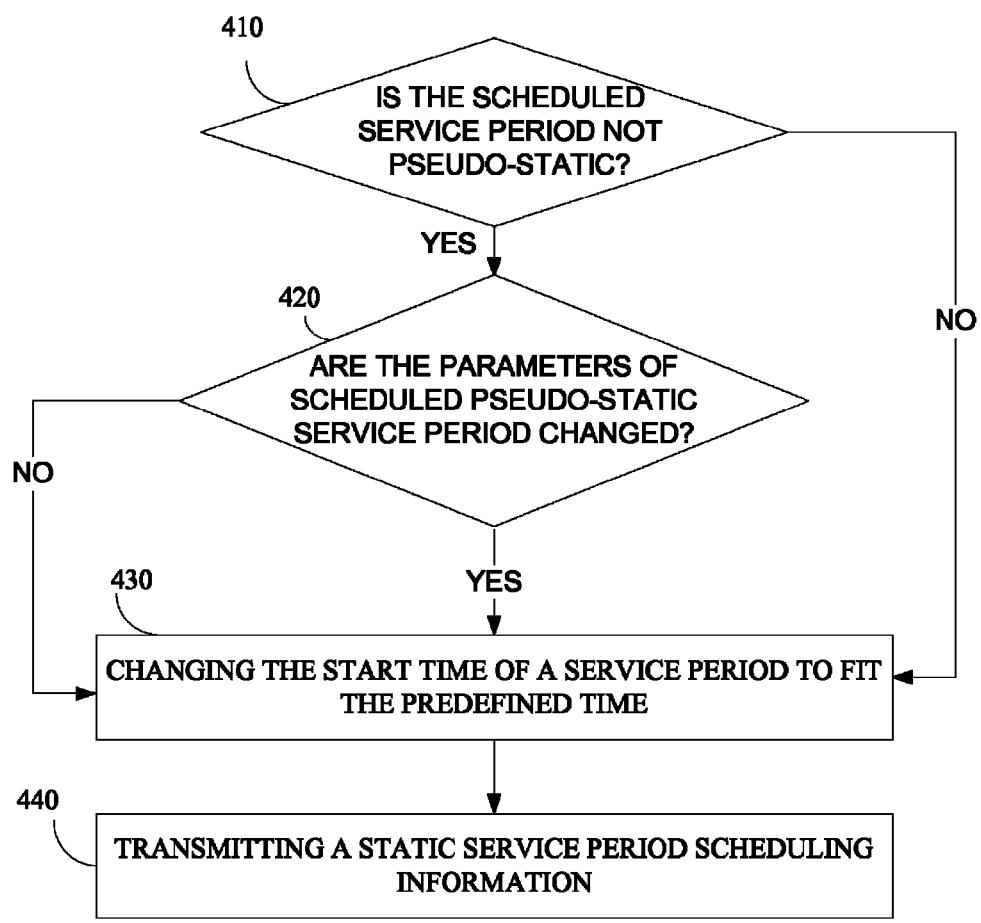
FIG. 4 is a flow chart of a method of scheduling a service period, according to exemplary embodiments of the invention.

FIG. 4 is a flow chart of a method of scheduling a service period, according to exemplary embodiments of the invention. For example the method may be executed by a MAC processor e.g., MAC processor 240 from instructions stored in memory 250, if desired.

The method of scheduling the SP in a wireless network may set a start time of a SP at the wireless network (e.g., network 100) by a wireless network controller (e.g., PCP or AP) wherein the start time is, or starts, a no less than a predefined time after transmitting by the wireless network controller an information element containing the service period scheduling information.

The method of scheduling may start if the scheduling period is not a pseudo static SP (diamond 410) and if at least one of the scheduled pseudo-static SP parameters have changed (diamond 420) then the method may continue by changing the start time of an existing pseudo-static SP which has a non PCP station as a source DBand station and/or changing the start time of an existing pseudo-static SP which has a non PCP station as a destination DBand station of the service period (text box 430). The method may end by transmitting static SP scheduling information (text box 440) to at least one of the stations (e.g., STA 110 and/or 120), if desired.

According to embodiments of the invention, the DBand may be any frequency band above 45 GHz and the predefined time may be 300 micro-seconds, although the scope of the present invention is not limited to this example.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of scheduling a service period in a wireless network, the method comprising:
setting a start time of a nonpseudo-static service period or an existing pseudo-static service period at the wireless network by a wireless network controller, wherein the start time is set to no less than a minimal allocation delivery time after transmitting by the wireless network controller a last information element containing scheduling information of the service period.

2. The method of claim 1 wherein setting comprises:
transmitting a non-pseudo static service period scheduling information.

3. The method of claim 1, wherein setting comprises:
changing a start time of an existing pseudo-static service period of a source directional band (DBand) station, wherein a directional band is a frequency band above 45 GHz.

4. The method of claim 1, wherein setting comprises:
changing a start time of an existing pseudo-static service period of a destination directional band (DBand) station, wherein a directional band is a frequency band above 45 GHz.

5. The method of claim 1, wherein the minimal allocation delivery time is 300 micro-seconds.

6. A wireless network controller to schedule a service period in a wireless network, the controller comprising:
a medium access control (MAC) processor to set a start time of a service period at a personal basic service set (PBSS) within the wireless network, the service period including a non-pseudo-static service period or an existing pseudo-static service period, wherein the start time is set to no less than a minimal allocation delivery time after transmission of an information element containing scheduling information of the service period.

7. The wireless network controller of claim 6 comprising:
a transmitter operably coupled to an antenna array which is able to transmit a non-pseudo static service period scheduling information.

8. The wireless network controller of claim 6, wherein the wireless network controller comprises a PBSS control point (PCP).

9. The wireless network controller of claim 6, wherein the wireless network controller comprises an access point (AP).

10. The wireless network controller of claim 8, wherein the MAC processor is able to change a start time of an existing pseudo-static service period which has a non PCP station as a source directional band (DBand) station, wherein a directional band is a frequency band above 45 GHz.

11. The PCP of claim 8, wherein the MAC processor is able to change a start time of an existing pseudo-static service period which has a non PCP station as a destination directional band (DBand) station of the service period, wherein a directional band is a frequency band above 45 GHz.

12. The wireless network controller of claim 6, wherein the minimal allocation delivery time is 300 micro-seconds.

13. The wireless network controller of claim 7 wherein the antenna array is a phase array antenna.

14. A wireless communication system comprising:
a personal basic service set (PBSS) control point (PCP) to schedule a service period, the PCP comprising:
a medium access control (MAC) processor to set a start time of a service period at a personal basic service set (PBSS), the service period including a nonpseudo-static service period or an existing pseudo-static service period, wherein the start time is to be set to no less than a minimal allocation delivery time after transmission of an information element containing scheduling information of the service period.

15. The wireless communication system of claim 14, wherein the PCP comprises:
a transmitter operably coupled to an antenna array which is able to transmit a non-pseudo static service period scheduling information.

16. The wireless communication system of claim 14, wherein the MAC processor of the PCP is able to change a start time of an existing pseudo-static service period which has a non PCP station as a source directional band (DBand) station, wherein a directional band is a frequency band above 45 GHz.

17. The wireless communication system of claim 14, wherein the MAC processor of the PCP is able to change a start time of an existing pseudo-static service period which has a non PCP station as a destination directional band (DBand) station of the service period, wherein a directional band is a frequency band above 45 GHz.

18. The wireless communication system of claim 14, wherein the minimal allocation delivery time is 300 micro-seconds.

19. A medium access control (MAC) processor comprising:
- a non-transitory computer-readable storage medium, having stored thereon instructions, that when executed, result in:
- setting a start time of a service period at a wireless network by a wireless network controller, the service period including a nonpseudo-static service period or an existing pseudo-static service period, wherein the start time is to be set to no less than a minimal allocation delivery time after transmitting by the wireless network controller an information element containing scheduling information of the service period.

20. The MAC processor of claim 19 wherein the instructions when executed, result in:
- transmitting a non-pseudo static service period scheduling information.

21. The MAC processor of claim 19, wherein the instructions when executed, result in:
- changing a start time of an existing pseudo-static service period of a source directional band (DBand) station, wherein a directional band is a frequency band above 45 GHz Hz.

22. The MAC processor of claim 19, wherein the instructions when executed, result in:
- changing a start time of an existing pseudo-static service period of a destination directional band (DBand) station of the service period, wherein a directional band is a frequency band above 45 GHz.

* * * * *

UNITED STATES PATENT AND TRADEMARK OFFICE
CERTIFICATE OF CORRECTION

PATENT NO. : 8,619,650 B2  
APPLICATION NO. : 13/004389  
DATED : December 31, 2013  
INVENTOR(S) : Solomon B. Trainin et al.

Page 1 of 1

It is certified that error appears in the above-identified patent and that said Letters Patent is hereby corrected as shown below:

On the title page, item (56), in column 2, under "Other Publications", line 8,
delete "802.15.3c™-2003)." and insert -- 802.15.3™-2003). --, therefor.

In the Claims

In column 8, line 9-10, in claim 6, delete "is set" and insert -- is to be set --, therefor.

In column 9, line 23, in claim 21, delete "Ghz Hz." and insert -- GHz. --, therefor.

Signed and Sealed this
Twenty-ninth Day of April, 2014

Michelle K. Lee
*Deputy Director of the United States Patent and Trademark Office*